United States Patent
Kim et al.

(10) Patent No.: US 8,730,567 B2
(45) Date of Patent: May 20, 2014

(54) TERAHERTZ CONTINUOUS WAVE GENERATOR

(75) Inventors: Sungil Kim, Daejeon (KR); Kwang-Yong Kang, Daejeon (KR); Dong Suk Jun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 420 days.

(21) Appl. No.: 13/291,225

(22) Filed: Nov. 8, 2011

(65) Prior Publication Data
US 2012/0162747 A1    Jun. 28, 2012

(30) Foreign Application Priority Data
Dec. 23, 2010  (KR) .................. 10-2010-0134048

(51) Int. Cl.
*G02F 1/35* (2006.01)
*G02F 1/01* (2006.01)
*H01S 3/00* (2006.01)

(52) U.S. Cl.
CPC .......... *G02F 1/3534* (2013.01); *G02F 2203/13* (2013.01); *H01S 3/0078* (2013.01)
USPC ........... 359/330; 359/326; 359/239; 359/349; 372/29.014

(58) Field of Classification Search
None
See application file for complete search history.

(56) References Cited

U.S. PATENT DOCUMENTS

| 7,212,331 B2 | 5/2007 | Kawanishi et al. |
| 7,764,422 B2 * | 7/2010 | Ichikawa ..................... 359/330 |
| 7,768,696 B2 * | 8/2010 | Higuma et al. ............... 359/333 |
| 2008/0199124 A1 * | 8/2008 | Nagatsuma et al. ............. 385/8 |

FOREIGN PATENT DOCUMENTS

| JP | 2005-148390 A | 6/2005 |
| JP | 2007-047230 A | 2/2007 |

* cited by examiner

*Primary Examiner* — Hemang Sanghavi
(74) *Attorney, Agent, or Firm* — Rabin & Berdo, P.C.

(57) ABSTRACT

A terahertz continuous wave generator includes: an optical intensity modulator configured to modulate an optical signal into DSB optical signals; a local oscillator configured to generate a modulation signal for modulating the optical signal inputted to the optical intensity modulator into DSB optical signals; a notch filter configured to filter an optical signal with a specific frequency; an optical fiber amplifier configured to amplify an output signal of the optical intensity modulator; an optical circulator configured to transmit the optical signal inputted to the optical fiber amplifier to the notch filter and transmit the optical signal reflected from the notch filter to an input of the optical intensity modulator; an optical coupler configured to apply the optical signal to the optical intensity modulator; and an OE converter configured to photomix the DSB signals outputted through the notch filter.

9 Claims, 5 Drawing Sheets

TERAHERTZ CONTINUOUS WAVE GENERATOR

CROSS-REFERENCES TO RELATED APPLICATIONS

The present application claims priority under 35 U.S.C 119(a) to Korean Application No. 10-2010-0134048, filed on Dec. 23, 2010 in the Korean intellectual property Office, which is incorporated herein by reference in its entirety set forth in full.

BACKGROUND

Exemplary embodiments of the present invention relate to a terahertz continuous wave generator, and more particularly, to a terahertz continuous wave generator which generates a terahertz continuous wave (CW) through photomixing.

Recently, research has been actively conducted on photomixing that uses an optical signal to generate a CW signal having a frequency of nm-wave bands or more, which is not sensitive to low phase noise, temperature, and an operation environment such as a radio environment.

Photomixing is to generate a CW in a ultra-high frequency band, a mm-wave band, and a terahertz (THz) band, which has low phase noise and narrow FWHM (full wave half maximum), by beating two different optical signals through an opto-electric converter (OE converter).

Meanwhile, a terahertz continuous wave generator using photomixing generates two optical signals maintaining a strong correlation and having different wavelengths from one optical source and beats the generated signals, in order to minimize frequency drift and generate a stable CW THz signal.

The terahertz continuous wave generation system, which includes one optical source, passive optical parts, and an OE converter, generates optical signals having two or more kinds of wavelengths from the optical source, and then uses the generated optical signals. Therefore, since the correlation between two wavelengths to be beaten is high, the system may reduce phase noise and increase the frequency stability of the generated signals.

A method for generating a signal of a THz-range frequency from one optical source includes a mode locking laser method, a dual mode laser method, an injection locking method, double sideband-suppressed carrier (DSB-SC) generation, and a frequency comb method.

In the case of the mode locking laser method and the dual mode laser method, an optical device is difficult to manufacture, and the competitiveness thereof is insufficient in terms of the development cost and price of devices. Therefore, the effectiveness of commercialization for the mode locking laser method and the dual mode laser method becomes a problem. In the injection locking method, a locking process should be performed to obtain a desired frequency signal. Therefore, since the operation condition is complicated, the injection locking method has a limit in effectiveness. The frequency comb method includes an optical source, an optical intensity modulator, two optical phase modulators, arrayed waveguide grating (AWG), and an OE converter. In the frequency comb method, the frequency of a generated signal is variable depending on the performance of the optical phase modulator and the AWG, and two expensive optical phase modulators and expensive AWG are required. The DSB-SC generation is a kind of optical heterodyne method and has a simple configuration. Furthermore, it is easy to obtain a desired frequency signal, compared with the above-described methods. Therefore, much research has been conducted on the DSB-SC generation.

A terahertz continuous wave generator using the DSB-SC generation includes one laser diode (LD), passive optical parts, an optical fiber amplifier and so on. The passive optical parts include an optical intensity modulator, an ultrahigh frequency local oscillator (LO), an OE converter, an optical filter and so on, and the optical fiber amplifier is configured to amplify generated DSB signals.

The laser diode is an optical carrier generation source for generating two optical signals having different wavelengths, between which the correlation is high, in the terahertz continuous wave generator using the DSB-SC generation. Such an optical carrier is modulated into DSB signals by a local oscillator signal which is outputted from the ultrahigh frequency local oscillator and then inputted to the optical intensity modulator. The DSB-modulated optical signals are inputted to the OE converter to generate a THz CW signal through photomixing.

In general, an optical filter such as a notch filter or AWG is used to remove an optical carrier existing with the DSB signals on an optical spectrum, in order to increase the stability of the generated THz CW signal and reduce noise. Furthermore, an optical amplifier such as an Er-doped fiber amplifier is used to compensate for attenuation of the DSB signals caused by an insertion loss of the optical filter and increase the magnitude of the DSB signals, thereby generating a THz CW with high power.

The above-described configuration is a related art for helping an understanding of the present invention, and does not mean a related art which is widely known in the technical field to which the present invention belongs.

The conventional terahertz continuous wave generator using the DSB-SC generation may reduce phase noise and increase the frequency stability of a generated signal. However, since an expensive optical source for generating an optical carrier should be used, a manufacturing cost inevitably increases.

SUMMARY

An embodiment of the present invention relates to a terahertz continuous wave generator capable of reducing a manufacturing cost without reducing a power characteristic of a terahertz continuous wave generator.

In one embodiment, a terahertz continuous wave generator includes: an optical intensity modulator configured to modulate an optical signal into DSB optical signals; a local oscillator configured to generate a modulation signal for modulating the optical signal inputted to the optical intensity modulator into DSB optical signals; a notch filter configured to filter an optical signal with a specific frequency; an optical fiber amplifier configured to amplify an output signal of the optical intensity modulator, or generate an optical signal having a wider wavelength range than a notch width of the notch filter when an optical signal is not provided; an optical circulator configured to transmit the optical signal inputted to the optical fiber amplifier to the notch filter and transmit the optical signal reflected from the notch filter to an input of the optical intensity modulator; an optical coupler configured to apply the optical signal, which is reflected from the notch filter and transmitted through the optical circulator, to the optical intensity modulator; and an OE converter configured to photomix the DSB signals outputted through the notch filter.

The optical fiber amplifier may emit saturation power at 20 dBm or more.

The optical fiber amplifier may have a reception sensitivity of −30 dBm or more and a gain of 30 dBm.

The frequency bandwidth of the optical intensity modulator is at least 0.3 times the frequency of a THz CW to be generated.

The local oscillator may output a frequency signal of which the frequency is 0.5 times the frequency difference between the DSB signals to be generated.

An optical signal isolation characteristic between a transmission port and a reflection port in the optical circulator may be 50 dB or more.

The notch width of the notch filter may be smaller than the wavelength difference between the DSB signals to be generated.

A difference between wavelength spacing of the DSB signals and the notch width of the notch filter may be ±0.1 nm or less.

The terahertz continuous wave generator may further include an optical amplifier installed at a rear end of the notch filter and configured to amplify the DSB signals.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Hereinafter, a terahertz continuous wave generator in accordance with an embodiment of the present invention will be described in detail with reference to the accompanying drawings. The drawings are not necessarily to scale and in some instances, proportions may have been exaggerated in order to clearly illustrate features of the embodiments. Furthermore, terms to be described below have been defined by considering functions in embodiments of the present invention, and may be defined differently depending on a user or operator's intention or practice. Therefore, the definitions of such terms are based on the descriptions of the entire present specification.

Figure 1:
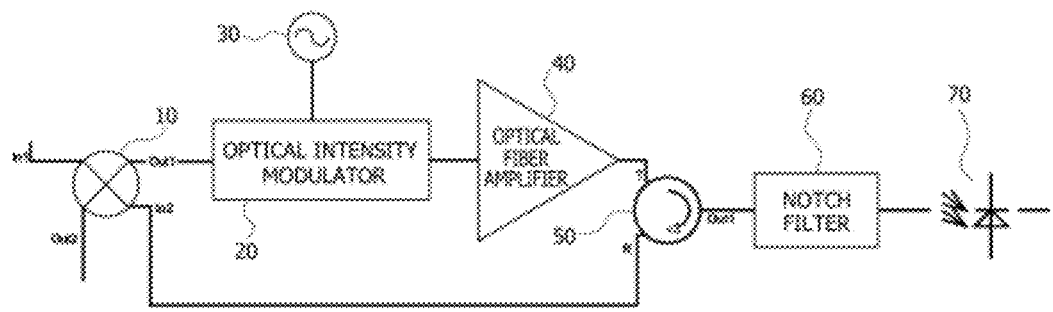
FIG. 1 is a configuration diagram of a terahertz continuous wave generator in accordance with an embodiment of the present invention.

FIG. 1 is a configuration diagram of a terahertz continuous wave generator in accordance with an embodiment of the present invention.

The terahertz continuous wave generator in accordance with the embodiment of the present invention includes an optical intensity modulator 20, a local oscillator 30, an optical fiber amplifier 40, an optical circulator 50, an optical coupler 10, a notch filter 60, and an OE converter 70.

The optical intensity modulator 20 is configured to modulate an inputted optical signal into DSB optical signals by using the frequency and power of the local oscillator 30. The frequency bandwidth of the optical intensity modulator 20 is set to be at least 0.3 times the frequency of a THz CW which is to be generated. Desirably, the frequency bandwidth may be set to be 0.5 times the frequency of the THz CW.

The local oscillator 30 is configured to generate a modulation signal for modulating an optical signal inputted to the optical intensity modulator 20 into DSB optical signals. The local oscillator 30 outputs a signal having a frequency of 0.5 times the frequency difference between the DSB signals which is to be generated.

The optical amplifier 40 is configured to amplify an output signal of the optical intensity modulator 20 and generate an optical signal having a wider wavelength band than the notch width of the notch filter, when an inputted optical signal is not provided. The optical amplifier 40 enables an emission of saturation power of 20 dBm or more, in order to maximize an optical signal reflected from the notch filter 60. Furthermore, the optical amplifier 40 provides a reception sensitivity of −30 dBm or more and a gain of 30 dB, in order to effectively amplifier a low optical signal outputted from the optical intensity modulator 20.

The optical circulator 50 is mounted between the optical amplifier 40 and the notch filter 60 and configured to transmit the optical signal inputted to the optical amplifier 40 to the notch filter 60 and transmit a wavelength reflected from the notch filter 60 to an input of the optical intensity modulator 20. For this operation, the optical circulator 50 is connected to a transmission port (T-port) for transmitting an output signal of the optical amplifier 40 only in a single direction. Meanwhile, an output port serving as a reflection port (R-port) is installed in such a manner as to transmit a signal only in a single direction. The optical circulator 50 sets an optical signal isolation characteristic between the T-port and the R-port to 50 dB or more.

The notch filter 60 is a filter having a rapid attenuation characteristic with respect to a specific frequency, and is configured to filter the optical signal inputted from the optical circulator 50. Such a notch filter 60 has a smaller notch width than a wavelength difference between DSB signals to be generated. Furthermore, a difference between the wavelength spacing of the DSB signals and the notch width may be set to be ±0.1 nm or less.

The optical coupler 10 is configured to apply the optical signal, which is reflected from the notch filter 60 to pass through the optical circulator 50, to the optical intensity modulator 20, and monitor the optical signal applied to the optical intensity modulator 20. For this operation, the optical coupler 10 is configured in 2×2 or 1×2. As the optical coupler 10, a 9:1 or 99:1 optical coupler may be used to maximize the optical signal inputted to the optical intensity modulator 20. Alternatively, a 5:5 optical coupler may be used to directly monitor an optical signal inputted to the optical intensity modulator 20.

The OE converter 70 is used as a photomixer for photomixing the DSB signals outputted from the notch filter 60. The OE converter 70 is configured to photomix the DSB signals outputted from the notch filter 60 and generate a THz CW.

In the embodiment of the present invention, the terahertz continuous wave generator may be further provided with an electronic control unit (not illustrated) which includes a DC input terminal of the optical intensity modulator 20, an optical intensity modulator stabilization circuit and so on.

The operation of the terahertz continuous wave generator in accordance with the embodiment of the present invention will be described as follows.

When an input optical signal is not provided, the optical fiber amplifier 40 has the same output characteristic as that of a white optical source within an operation wavelength range of the optical fiber amplifier 40. The operation wavelength range is much wider than the notch width of the notch filter 60.

The output of the optical amplifier 40 is inputted to the notch filter 60 through the T-port capable of transmitting a signal to an output port only in a single direction and the optical circulator 50 capable of transmitting a signal from the output port to the R-port only in a single direction.

The notch filter 60 reflects a wavelength range corresponding to the notch width at the input terminal of the notch filter 60. Accordingly, the wavelength range corresponding to the notch width is applied to the input of the optical intensity modulator 20 through the R-port of the optical circulator 50 and the optical coupler 10.

Here, one output Out1 between two outputs of the optical coupler 10 is connected to the optical intensity modulator 20, and the other output Out2 is used as a monitoring port for monitoring an optical signal applied to the optical intensity modulator 20.

The optical signal applied to the input of the optical intensity modulator 20 is modulated into DSB signals which have a larger wavelength difference than the notch width of the notch filter 60 and between which the correlation is high, by an ultrahigh frequency signal of the local oscillator 30. The DSB signals are applied to the optical amplifier 40 and then amplified by the optical fiber amplifier 50.

In this case, the outputs having a larger wavelength difference than the notch width are inputted too the OE-converter 70 through the notch filter 60, and beaten by the OE-converter 70 to generate a THz CW.

Figure 2:
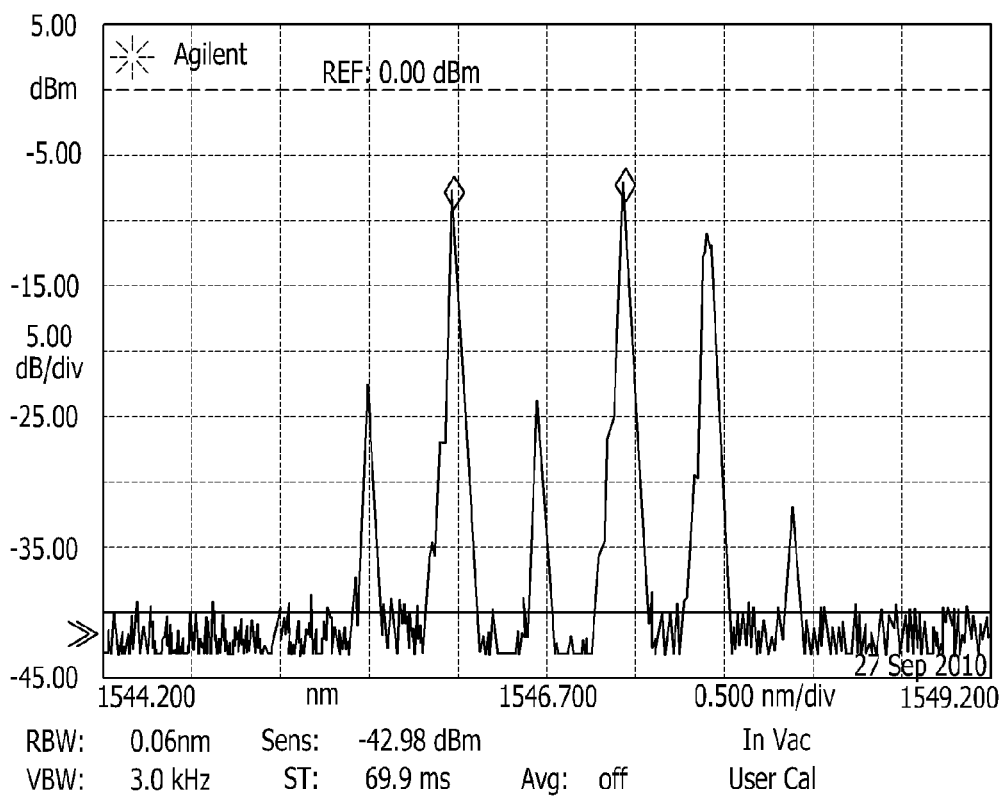
FIG. 2 is a diagram showing a result obtained by measuring output characteristics of the terahertz continuous wave generator for 0.12 THz in accordance with the embodiment of the present invention.
Figure 3:
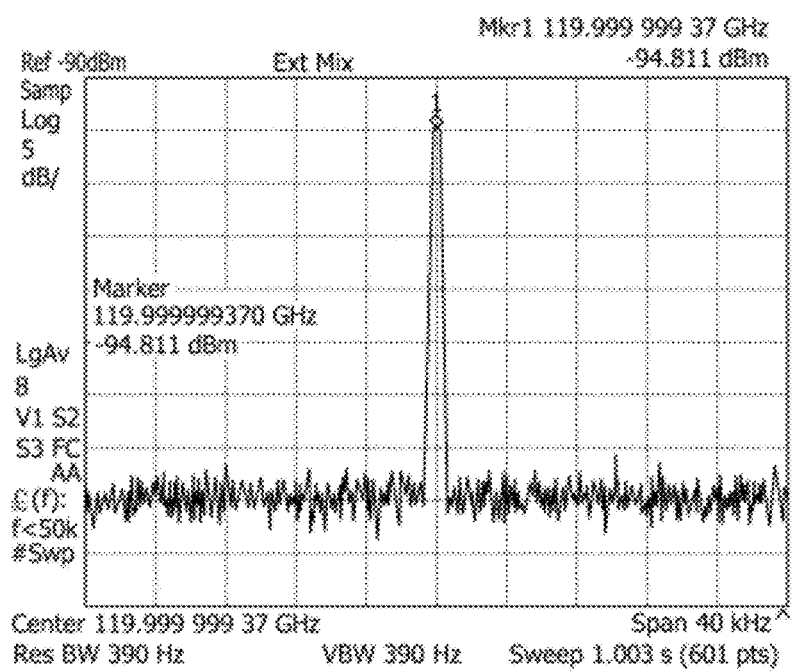
FIG. 3 is a diagram showing a result obtained by measuring a THz CW with a frequency of 0.12 THz in accordance with the embodiment of the present invention.

FIGS. 2 and 3 show measurement results through an optical spectrum analyzer (OSA) for monitoring the terahertz continuous wave generation operation and an electrical spectrum analyzer (ESA) for monitoring the performance of the ultrahigh frequency local oscillator 30 and measuring a terahertz signal generated through the OE-converter 70 in such a terahertz continuous wave generator.

Figure 4:
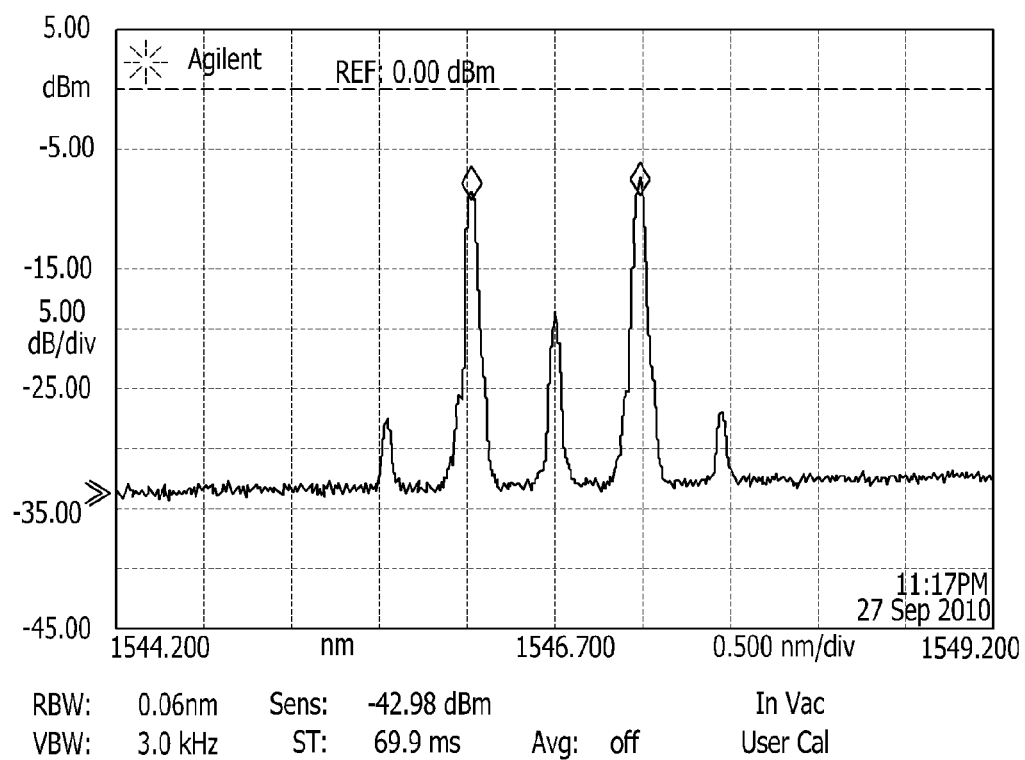
FIG. 4 is a diagram showing a result obtained by measuring DSB optical signals generated by the conventional DSB-SC generation method for 0.12 THz.
Figure 5:
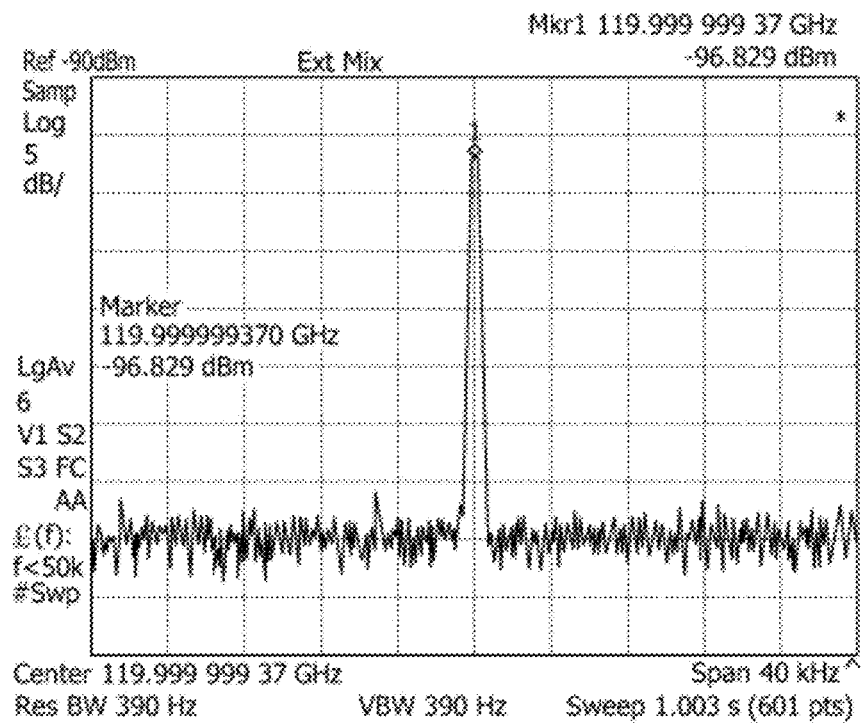
FIG. 5 is a diagram showing a result obtained by measuring a 0.12 THz CW generated by the conventional DSB-SC generation method.
Figure 6:
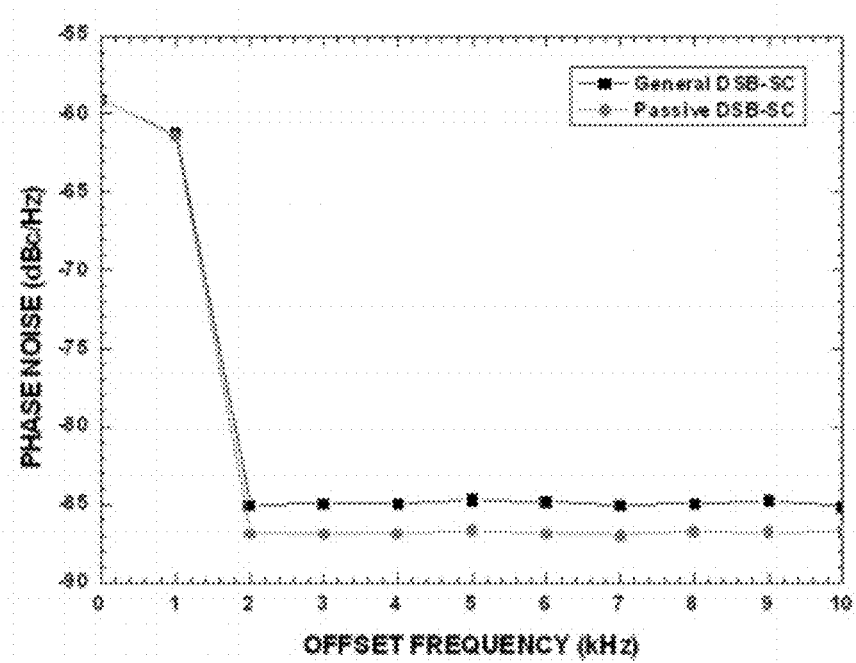
FIG. 6 is a diagram showing results obtained by analyzing phase noise characteristics of the embodiment of the present invention and the conventional DSB-SC generation method.

FIG. 2 is a diagram showing a result obtained by measuring output characteristics of the terahertz continuous wave generator for 0.12 THz in accordance with the embodiment of the present invention. FIG. 3 is a diagram showing a result obtained by measuring a THz CW with a frequency of 0.12 THz in accordance with the embodiment of the present invention. FIG. 4 is a diagram showing a result obtained by measuring DSB optical signals generated by the conventional DSB-SC generation method for 0.12 THz. FIG. 5 is a diagram showing a result obtained by measuring a 0.12 THz CW generated by the conventional DSB-SC generation method. FIG. 6 is a diagram showing results obtained by analyzing phase noise characteristics of the embodiment of the present invention and the conventional DSB-SC generation method.

In accordance with the embodiment of the present invention a THz signal may be generated at a frequency of THz bands, under an assumption that the modulation bandwidth of the optical intensity modulator 20 is sufficiently wide. However, as shown in FIG. 3, the 0.12 THz signal was generated to verify the present invention within the limits of the current measurement technology and measurement equipment.

Comparing FIGS. 2 and 3 showing the measurement results in accordance with the embodiment of the present invention with the results of FIGS. 4 and 5 showing the characteristics of the DSB signals generated by the conventional DSB-SC generation method and the 0.12 THz CW signal, it is possible to confirm similar output characteristics.

Furthermore, as shown in FIG. 6, it can be seen that the phase noise characteristic, which is one of main characteristics of a CW signal, in accordance with the embodiment of the present invention was improved more than in the conventional DSB-SC generation method.

Therefore, in accordance with the embodiment of the present invention, an expensive optical source may be removed without a reduction in output characteristic of the terahertz continuous wave generator. Therefore, it is possible to reduce the price of the terahertz continuous wave generator.

The technical scope of the present invention has been described as an example in which the OE-converter 70 is installed at the output terminal. However, the technical scope is not limited thereto, and an optical amplifier (not illustrated) may be additionally provided at the rear end of the notch filter 60, in order to prepare for a case in which the outputted DSB signals are significantly attenuated. In this case, the optical amplifier has a noise characteristic of 6 dB or less and a maximum gain of 30 dB.

In accordance with the embodiment of the present invention, it is possible to implement a stable terahertz continuous wave generator at a low price. The terahertz continuous wave generator may be utilized as a core system for implementing a wireless high-speed broadband THz wireless communication system.

Furthermore, it is possible to construct a seamless connection to an optical communication network utilized as a backbone communication network which has already been installed. Therefore, it is easy to implement a seamless wired and wireless integrated network without delay.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A terahertz continuous wave generator comprising:
    an optical intensity modulator configured to modulate an optical signal into double sideband (DSB) optical signals;
    a local oscillator configured to generate a modulation signal for modulating the optical signal inputted to the optical intensity modulator into DSB optical signals;
    a notch filter configured to filter an optical signal with a specific frequency;
    an optical fiber amplifier configured to amplify an output signal of the optical intensity modulator, or generate an optical signal having a wider wavelength range than a notch width of the notch filter when an optical signal is not provided;
    an optical circulator configured to transmit the optical signal inputted to the optical fiber amplifier to the notch filter and transmit the optical signal reflected from the notch filter to an input of the optical intensity modulator;
    an optical coupler configured to apply the optical signal, which is reflected from the notch filter and transmitted through the optical circulator, to the optical intensity modulator; and an opto-electric converter (OE converter) configured to photomix the DSB signals outputted through the notch filter.

2. The terahertz continuous wave generator of claim 1, wherein the optical fiber amplifier emits saturation power at 20 dBm or more.

3. The terahertz continuous wave generator of claim 1, wherein the optical fiber amplifier has a reception sensitivity of −30 dBm or more and a gain of 30 dBm.

4. The terahertz continuous wave generator of claim 1, wherein the frequency bandwidth of the optical intensity modulator is at least 0.3 times the frequency of a terahertz continuous wave to be generated.

5. The terahertz continuous wave generator of claim 1, wherein the local oscillator outputs a frequency signal of which the frequency is 0.5 times the frequency difference between the DSB signals to be generated.

6. The terahertz continuous wave generator of claim 1, wherein an optical signal isolation characteristic between a transmission port and a reflection port in the optical circulator is 50 dB or more.

7. The terahertz continuous wave generator of claim 1, wherein the notch width of the notch filter is smaller than the wavelength difference between the DSB signals to be generated.

8. The terahertz continuous wave generator of claim 6, wherein a difference between wavelength spacing of the DSB signals and the notch width of the notch filter is ±0.1 nm or less.

9. The terahertz continuous wave generator of claim 1, further comprising an optical amplifier installed at a rear end of the notch filter and configured to amplify the DSB signals.

* * * * *